United States Patent [19]

Law

[11] Patent Number: 4,493,522

[45] Date of Patent: Jan. 15, 1985

[54] SEALED CABLE CONNECTOR
[75] Inventor: Joseph P. Law, Scotch Plains, N.J.
[73] Assignee: Thomas & Betts Corporation, Raritan, N.J.
[21] Appl. No.: 438,122
[22] Filed: Nov. 1, 1982
[51] Int. Cl.³ .................... H01R 4/00; H01R 17/18
[52] U.S. Cl. ........................... 339/94 C; 339/177 R
[58] Field of Search ............ 339/94 C, 177 R, 177 E
[56] References Cited
U.S. PATENT DOCUMENTS

| 3,107,135 | 10/1963 | Keil .................. 339/177 R X |
| 3,170,748 | 2/1965 | Van Horssen ........... 339/94 C X |
| 4,397,516 | 8/1983 | Koren et al. ............ 339/177 R |

FOREIGN PATENT DOCUMENTS

| 284157 | 9/1963 | Australia . |
| 271067 | 11/1966 | Australia . |
| 63853/65 | 3/1967 | Australia . |
| 41223/68 | 1/1971 | Australia . |
| 18156/70 | 2/1972 | Australia . |
| 31962/71 | 6/1975 | Australia . |
| 64313/74 | 3/1976 | Australia . |
| 16847/70 | 3/1977 | Australia . |

Primary Examiner—Eugene F. Desmond
Assistant Examiner—Steven C. Bishop
Attorney, Agent, or Firm—Robert M. Rodrick; Salvatore J. Abbruzzese

[57]  ABSTRACT

An environmentally sealed cable connector for terminating wire jacketed cable. The connector includes a body for receiving the cable and a gland nut for securing the cable to the body. A clamping member places the wire jacket in grounding connection with the connector upon securment of the gland nut to the body. The urging means further provides a seal between the body and the cable, preventing hazardous gases from passing therebetween.

16 Claims, 2 Drawing Figures

SEALED CABLE CONNECTOR

FIELD OF THE INVENTION

This invention relates to a connector for terminating electrical cable and more particularly to cable connectors for use in hazardous environments.

BACKGROUND OF THE INVENTION

Electrical connectors or glands have long been used to terminate and connect jacketed cable to various electrical devices such as motors, panel boards, junction boxes and the like. It is also known that often these connectors must connect cable in a variety of hazardous locations where explosive gases may be present. In these hazardous atmospheres the cable connection must be fully sealed to prevent the hazardous gases from passing through the connector into the electrical apparatus. In addition to sealing the cable, the connector also desirably has a high degree of pull-out strength to prevent the cable from becoming dislodged from the connector which would result in an ineffective connection. In the case of single wire armored cable, the connector further provides ground continuity between the cable and electrical device.

Explosion-proof connectors which prevent passage of hazardous gases through the connector, presently in use generally include a multiplicity of components including various gland nuts, each of which must be properly tightened to insure a complete seal. The disadvantages of such structures are readily apparent. As the structures are complex and difficult to assemble, an adequate seal may not be assured.

Beyond the multiple component connector, the cable terminating art has seen improvements in explosion-proof connectors. In a commonly assigned co-pending application, Ser. No. 06/369,112, filed Apr. 16, 1982, a cable connector is disclosed which provides an environmentally sealed connection with relatively few parts and which overcomes many of the disadvantages of prior connectors. These connectors provide for the reception of a sealing compound therein which surrounds the cable, preventing hazardous gases from passing therearound.

While these "filled" connectors provide a suitable environmental seal, it is desirable to have a connector which needs no filling compound, thereby eliminating cost in materials and time, and yet be easy to assemble and constructed with relatively few parts.

SUMMARY OF THE INVENTION

It is therefore an object of the present invention to provide an improved cable connector.

It is a more particular object to provide an environmentally sealed cable connector for use in hazardous locations.

In the efficient attainment of the foregoing and other objects, the present invention looks toward providing a cable connector comprising a body for receiving the cable and a conductive member for establishing ground connection with the metallic jacket of the cable. The connector further includes a clamping member which is movable in the connector to provide the electrical connection and to provide a seal between the cable and connector. In preferred form the clamping member is integral and includes sealing means and an urging member for effecting both the cable seal and ground connection.

DETAILED DESCRIPTION OF THE PREFERRED EMBODIMENT

The presently described invention is used to terminate cable of the type generally referred to as single-wire armored power cable. These cables are normally connected to an electrical device housed in a junction box. In addition to mechanically connecting the cable in the box, the connector also provides electrical connection therebetween.

Figure 2:
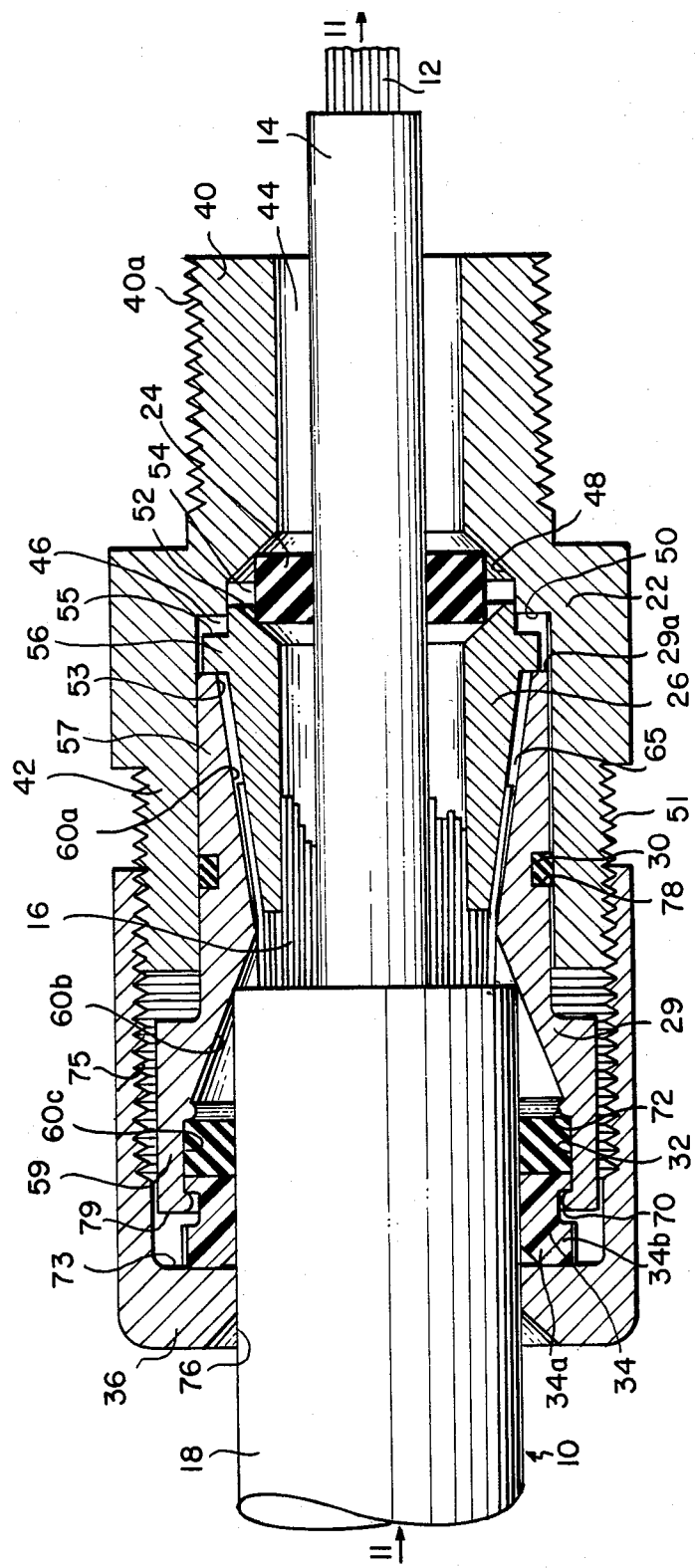
FIG. 2 is a longitudinal sectional showing of the assembled connector of FIG. 1 including therein, and partially shown in section, a jacketed single-wire armored cable.

Cable 10, shown in terminated condition in FIG. 2, includes a plurality of conductors 12 which may or may not be individually insulated. An extruded insulative sheath 14 extends around the conductors 12. A metallic armor sheath 16 typically comprising stranded galvanized steel wire, and referred to in the industry as single-wire armor, surrounds the insulative sheath 14 and is used to electrically ground the connection. The entire cable 12 is surrounded by an outer insulative jacket 18.

Figure 1:
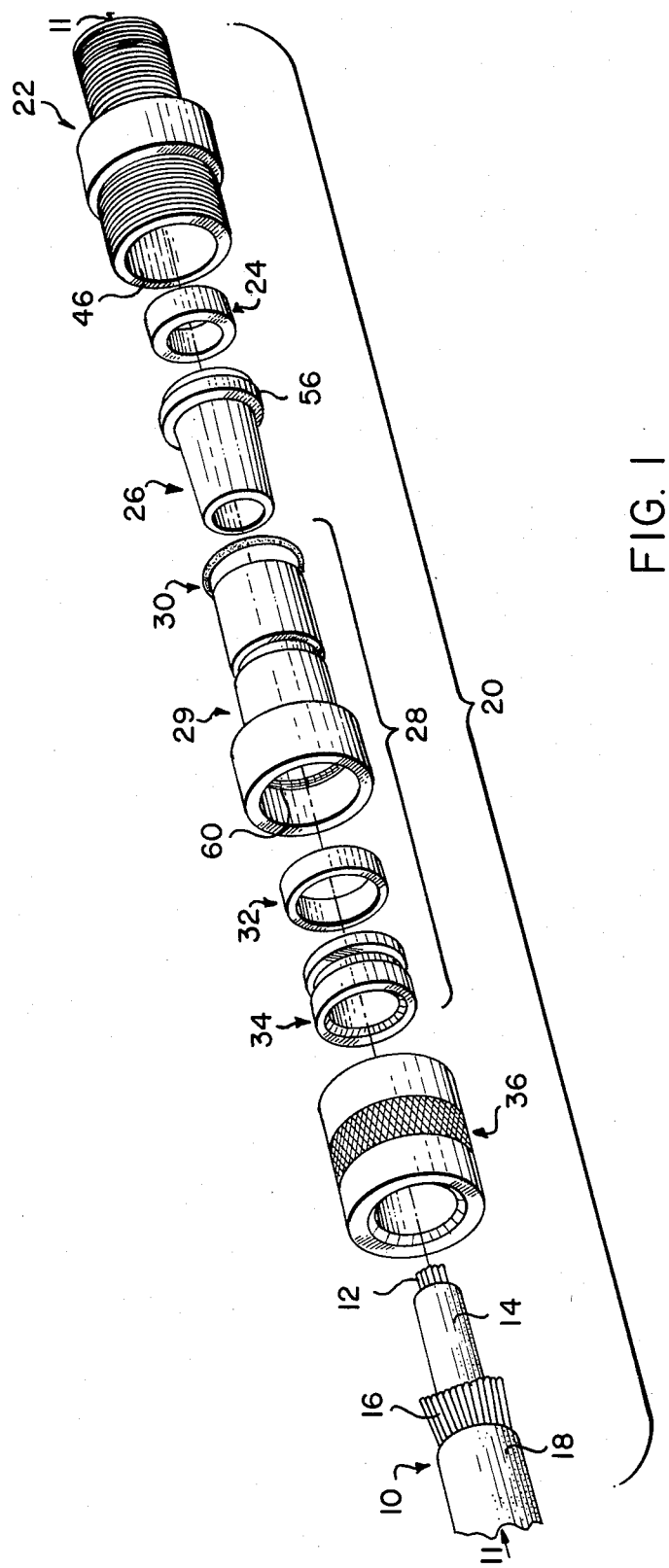
FIG. 1 shows in exploded perspective view, the components of the cable connector of the present invention.

Referring now to FIG. 1, connector 20, shown in exploded view, includes a connector body 22, a forward sealing ring 24, a grounding cone 26, a pre-assembled clamping module sub-assembly 28 including a clamping body 29, a captive O-ring 30, a cable sealing ring 32, and a seal urging member 34; and gland nut 36. Typically, body 22, grounding cone 26 and clamping body 29 are formed of a suitable metal such as brass and sealing rings 24, 30 and 32 are formed of a compressable elastomer such as neoprene. The urging member 34 is formed of a suitable rigid plastic material. Each of the connector elements will now be described in greater detail with reference to FIGS. 1 and 2.

Connector body 22 is an elongate hollow, generally cylindrical member having a conductor egressing portion 40 for permitting egress of the insulated conductors and a larger, conductor receiving portion 42 for receiving the conductors therein. Conductor egressing portion 40 includes a first cylindrical bore 44 extending therethrough for allowing passage of the jacket 14 which contains conductors 12 therein. Conductor egressing portion 40 is externally screw threaded at one end 40a for screw-type cooperation with a junction box (not shown) or other electrical apparatus to which cable 10 is to be connected. Larger conductor receiving portion 42 includes therethrough, a cylindrical bore 46, larger than bore 44 and in communication therewith (FIG. 2). The inner surface of connector body 22 at the transition between smaller cylindrical bore 44 and larger cylindrical bore 46 includes a conically tapered surface 48, tapering toward smaller bore 44. Forward sealing ring 24, which is placed over insulative sheath 14, is seated against this tapered surface 48. The end of larger conductor receiving portion 42, adjacent conductor egressing end 40, includes an inwardly extending annular shoulder 50 at the base of conically tapered surface 48. Shoulder 50 serves as a stop surface for grounding cone 26 when connector 20 is assembled as shown in FIG. 2 and as will be described in greater detail hereinafter. The end 51 of larger conductor receiving portion 42 is also externally screw threaded for connection to internally threaded gland nut 36.

Receivable in body 22 is grounding cone 26 which is a generally tubular member having a tapered outer surface and cylindrical inner surface, the wider end being received in conductor receiving portion 42 of body 22 to abut against forward sealing ring 24. An outer edge 52 of the wider end of cone 26 is inwardly chamfered in a direction opposite that of tapered surface 48 so as to form an annular chamber 54 therewith for accommodating sealing ring 24. Inwardly adjacent outer chamfered edge 52, is an outwardly extending annular shoulder 56, a lateral surface 55 of which engages the stop surface formed by shoulder 50 of connector body 22, as will be described in detail hereinafter.

Immediately adjacent grounding cone 26 is preassembled clamping module sub-assembly 28 (FIG. 1), including clamping body 29 having first cylindrical portion 57 adjacent grounding cone 26 and a second larger cylindrical portion 59 at the opposite end thereof. Clamping body 29 has a central bore 60 (FIG. 1) extending therethrough. Bore 60 defines a first tapered extent 60a adjacent grounding cone 26 which tapers in a direction coincident with the taper of the frustroconical surface of cone 26 thereof. First tapered extent 60a and grounding cone 26 form therebetween a sheath receiving chamber 65 for receipt of the metallic sheath 16 of cable 10, as will be described in detail hereinafter. A second tapered extent 60b of bore 60, which is generally centrally located, tapers in a direction opposite that of extent 60a in order to accommodate therein, outer jacket 18 of cable 10. The larger end of extent 60b has a diameter greater than the outer diameter of cable jacket 18 so as to permit ready entry, while the opposite smaller end has a diameter less than cable jacket 18 so that the cable jacket 18 will abut against the tapered surface.

Central bore 60 of clamping body 29 further defines a third cylindrical extent 60c adjacent the larger end of second tapered extent 60b. Cylindrical extent 60c is bounded at either axial end by a pair of inwardly projecting ribs 70 and 72. Rib 70 forms the outer end of clamping body 29 while rib 72 extends axially inwardly adjacent the junction of second tapered extent 60b and cylindrical extent 60c. Annular ribs 70 and 72 form thereinbetween a retaining region for accommodating both annular sealing ring 32 and seal urging member 34.

Cable sealing ring 32, which is pre-assembled in cylindrical bore 60c for attachment over the cable jacket 18, has a length (measured along central axis 11) which is less than the length of cylindrical bore 60c and seats at the inner end thereof. Seal urging member 34, also an annular member for attachment over cable jacket 18, has a length such that when sealing ring 32 and urging member 34 are seated in bore 60c, an outer extent 34a will extend beyond the adjacent end of clamping body 29. Seal urging member 34 includes an annular circumferential groove 34b which is dimensioned to readily accommodate annular rib 70. As groove 34b of seal urging member 34 has both a greater width and depth than the corresponding extents of rib 70, clearance is provided therebetween which allows seal urging member 34 to be freely rotatable about rib 70.

In order to provide a seal at the screw connection of body 22 to gland 36, the outer surface of clamping body 29 includes an annular groove 78 which seats therein O-ring 30. The O-ring 30 is compressed against inner surface of body 22, upon assembly adjacent the screw threading to provide a seal therebetween.

The final component of the connector 20 is gland nut 36 which includes a screw threaded inner surface 75 at one end which cooperates with the external threads 52 of connector body 22. The gland nut 36 also includes a central opening 76 at the opposite end thereof for slideable engagement over cable 10. A flat inner surface 73 circumjacent opening 76 mates directly with the outer edge of seal urging member 34, to urge member 34 against sealing ring 32 upon assembly.

Having described the connector, the termination of cable 10 may now be described with reference to FIG. 2.

Cable 10 is initially prepared by stripping back a portion of outer jacket 18. Thereafter, a portion of the metallic sheath 16 is stripped away, leaving an extent of inner jacketed insulation 14 with conductors 12 extending therethrough.

As shown in FIG. 2, gland nut 36 is placed over cable 10 around jacket 18. The clamping module subassembly 28, being preassembled, as an integral member with sealing ring 32 and urging member 34 inserted in cylindrical bore 60c and O-ring 30 seated in groove 78, is slipped over cable 10 until the end of jacket 18 abuts the surface of tapered bore 60b. The grounding cone 26 is then inserted into the cone receiving portion 57 of clamp module 28 so that the strands of the metallic sheath 16 pass between the tapered grounding cone 26 and the tapered surface of distal bore 60a, as shown in FIG. 2. Forward sealing ring 24 is passed over insulated inner jacket 14 and seats against the chamfered outer edge 52 of grounding cone 26. The partially assembled connector 20 and cable 10 are then inserted into body 22. As above described, chamfered outer edge 52 of grounding cone 26 and tapered surface 48 of connector body 22 forms a partially enclosed chamber 54 for accommodating sealing ring 24.

Upon screw tightening gland nut 36 onto connector body 22, the flat inner surface 73 of the gland nut 36, circumjacent opening 76 will contact the outer edge of seal urging member 34 urging the same into intimate contact with sealing ring 32. Once urging member 34 is in contact with ring 32 and while captively held to clamping body 29, further screw tightening of gland nut 36 will force clamping module 28 progressively forward into connector body 22. This forward movement of clamping module 28 will radially contact sheath receiving chamber 65 which supports metallic sheath 16. The metallic sheath 16 will then be tightly wedged in sheath receiving chamber 65 between the clamping body 29 and the grounding cone 26, forming a ground connection therebetween. With the grounding connection secured, outer edge 29a of clamp body 29 will abut against the proximal lateral surface 53 of grounding cone shoulder 56 and urge grounding cone 26 toward conductor egressing end 40. Due to variation in the size of the metallic sheath 16, the outer edge 29a may not engage surface 53, however, due to the clamping effect about wire armor 16, the grounding cone 26 will still be urged toward conductor egressing end 40. The annular chamber 54 formed between chamfered end 52 of cone 26 and tapered surface 48 of body 22 will be contracted axially, thereby compressing sealing ring 24 around insulated sheath 14, forming a seal between the sheath 14 and body 22.

Continued further screw tightening and continued movement of gland nut 36 will urge sealing ring 32 out of captive engagement between annular rib 72 and urging member 34 and into the second tapered extent 60b of bore 60. As seal urging member 34 is secured for rotational movement about rib 70 and further as it is of plastic construction, urging member 34 will offer little frictional resistance against both the flat surface 73 of gland nut 36 and the sealing ring 32. Thus, frequent connection and disconnection of the connector will not damage the neoprene sealing ring 32 as may be the case if the metal gland nut would bear directly against the neoprene sealing ring. Once moved past annular rib 72, sealing ring 32 will be compressed into the narrowing bore 60b and around cable jacket 18. Urging member 34 also will move out of captive engagement with annular rib 70 and into cylindrical bore 60c where it will reside between annular ribs 70 and 72, whereupon flat surface 73 of gland nut 36 will contact the outer edge 79 of clamp module 28 in metal to metal engagement. Sealing ring 32, being forced into tapered bore 60b, will seal the outer jacket 18 of cable. Further, the O-ring 30 seated in annular grove 78 seals the connector about the screw threads between body 22 and gland nut 36. The connector 20 thereby forms a complete seal around cable 10. It is apparent that due to the integral construction of clamping module subassembly 28, the cable 10 can be sealed and cable ground connection can be made with the connector 20 by screw-tightening gland nut 36 to body 22, thus eliminating need for additional glands or screw parts.

The above-described seal also compressively secures the cable to the connector to form a connection with a high degree of mechanical strength. As the compression of clamping module 28 against grounding cone 26 forms a superior electrical ground connection, the cable will be suitably mechanically and electrically terminated by connector 20.

Various other modifications to the foregoing disclosed embodiment will be evident to those skilled in the art. Thus, the particularly described preferred embodiment is intended to be illustrative and not limited thereto. The true scope of the invention is set forth in the following claims.

What is claimed is:

1. A cable connector for attachment to an electrical cable having a conductive sheath and a plurality of conductors therein comprising:
   a body having a cable receiving end, a conductor egressing end and a central opening extending therethrough;
   a conductive member supported in said body for engagement with said conductive sheath;
   a gland nut for movable securement to said body;
   a sealing member supported between said conductive member and said body for sealing said cable therebetween;
   a clamping element for receiving said conductive member and forming therebetween a chamber for receipt of said conductive sheath, said clamping element further including a sealing ring for sealable engagement with said cable and a pushing element movably secured to said clamping element adjacent said first sealing ring for contact with said gland nut; and
   retaining means for securing said sealing ring and said pushing element in said clamping element.

2. The connector of claim 1 wherein said clamping element further includes a second sealing ring for providing a seal between said clamping element and said body.

3. The connector in accordance with claim 1 wherein retaining means includes a pair of spaced ribs defining a region, for captively accommodating said pushing element therein.

4. The connector in accordance with claim 3 wherein said pushing element is rotatably secured in said clamping element.

5. A cable connector for terminating an electrical cable having a conductive sheath and a plurality of conductors therein comprising:
   a body having a cable receiving end, a conductor egressing end and a central opening therethrough;
   a conductive member supported in said body for engagement with said conductive sheath;
   a sealing member supported between said conductive member and said body for providing a seal between said cable and said body;
   a gland nut for threadable attachment to said body;
   a self-contained sub-assembly having a longitudinal passage therethrough for receipt of said cable, said sub-assembly including:
   (a) a clamping element engageable with said conductive sheath for urging said conductive sheath into conductive contact with said conductive member;
   (b) a sealing member for providing a seal between said cable and said clamping element; and
   (c) a captively retained pushing element movably responsive to said gland nut threaded attachment for urging said clamping element into engagement with said conductive sheath.

6. The connector in accordance with claim 5 wherein said sealing member defines a sealing ring captively retained in said clamping element, said sealing ring being movably responsive to the movement of said pushing member for effecting said seal between said cable and said clamping element.

7. The connector in accordance with claim 6 wherein said sub-assembly further includes a second sealing ring for providing a seal between said clamping element and said body.

8. The connector in accordance with claim 7 wherein said clamping element defines a generally cylindrical hollow member defining said longitudinal passage, said hollow member having a tapered inner surface.

9. The connector in accordance with claim 8 wherein said clamping element defines two tapered surfaces, one adjacent said conductive member, the second adjacent said first sealing ring for engagement therewith.

10. The connector in accordance with claim 9 wherein said sub-assembly further includes a pair of spaced ribs radially inwardly projecting from said clamping element for providing rotatable captive engagement of said pushing element.

11. A connector for metallic jacketed cable comprising:
   a body having a longitudinal bore therethrough for passage of said cable;
   a hollow grounding member supported in said body for engagement with said metallic jacket;
   a first sealing ring disposed between said grounding member and said body for providing a cable seal therebetween;
   a gland nut for attachment to said body;
   an elongate, hollow clamping member movably supported in said body adjacent said grounding member for engagement with said metallic jacket upon attachment of said gland nut;

a second sealing ring for providing a seal between said clamping member and said body;

a pushing element captively retained at one end of said elongate clamping member adapted to be urged interiorly thereof upon attachment of said gland nut; and a third sealing ring movably retained in said clamping element adjacently interiorly of said pushing element for providing a seal between said cable and said clamping element upon attachment of said gland nut.

12. The connector in accordance with claim 11 wherein said clamping member, said second and third sealing rings and said pushing element are an integral unit.

13. The connector in accordance with claim 12 wherein said pushing element engages said third sealing ring and urges said third sealing ring interiorly of the clamping member upon attachment of said gland nut.

14. The connector in accordance with claim 13 wherein said clamping member includes an inwardly tapered inner surface adjacent said said third sealing ring.

15. The connector in accordance with claim 14 wherein said grounding member includes a frusto-conical portion and said clamping member includes a tapered inner surface adjacent said grounding member, which tapers coincidently with the frustro-conical taper of said grounding member to form therebetween an annular chamber for receipt of said metallic jacket.

16. The connector in accordance with claim 11 wherein said metallic cable jacket includes a plurality of conductive strands defining a cylindrical sheath.

* * * * *